(12) United States Patent
Hwang et al.

(10) Patent No.: US 8,789,647 B2
(45) Date of Patent: Jul. 29, 2014

(54) STEER BY WIRE APPARATUS

(75) Inventors: Sungwook Hwang, Anyang-si (KR);
Min Woo Han, Gimpo-si (KR); Un Koo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 859 days.

(21) Appl. No.: 12/876,479

(22) Filed: Sep. 7, 2010

(65) Prior Publication Data

US 2011/0132682 A1    Jun. 9, 2011

(30) Foreign Application Priority Data

Dec. 3, 2009  (KR) .................. 10-2009-0119407

(51) Int. Cl.
| | | |
|---|---|---|
| *B62D 5/04* | (2006.01) | |
| *B62D 7/16* | (2006.01) | |
| *F16H 23/00* | (2006.01) | |
| *F01B 3/02* | (2006.01) | |
| *F01B 3/00* | (2006.01) | |

(52) U.S. Cl.
CPC . *F01B 3/02* (2013.01); *F01B 3/007* (2013.01); *F16H 23/00* (2013.01)
USPC ............................................. 180/444; 74/60

(58) Field of Classification Search
CPC ........ F01B 3/0002; F01B 3/0023; F01B 3/02; F01B 3/007; F01B 3/0073; F01B 3/0076; B62D 5/0442; B62D 7/1581; F16H 23/00; F16H 23/02
USPC ............................................. 180/402; 74/60
See application file for complete search history.

(56) References Cited

U.S. PATENT DOCUMENTS

| | | | | | |
|---|---|---|---|---|---|
| 1,817,063 | A | * | 8/1931 | Carrie et al. ..................... | 91/485 |
| 2,913,911 | A | * | 11/1959 | Gilkey .............................. | 74/60 |
| 4,597,302 | A | * | 7/1986 | McLendon, Jr. ................. | 74/57 |
| 4,741,409 | A | * | 5/1988 | Westercamp et al. .......... | 180/413 |
| 4,987,963 | A | * | 1/1991 | Oslapas et al. ................ | 180/445 |
| 6,343,671 | B1 | * | 2/2002 | Ackermann et al. .......... | 180/444 |
| 6,488,115 | B1 | * | 12/2002 | Ozsoylu et al. ............... | 180/444 |
| 6,691,819 | B2 | * | 2/2004 | Menjak et al. ................ | 180/446 |
| 8,364,347 | B2 | * | 1/2013 | Tsukasaki et al. ............. | 701/41 |

(Continued)

FOREIGN PATENT DOCUMENTS

| | | |
|---|---|---|
| JP | 43-10802 | 5/1943 |
| JP | 61-65916 A | 4/1986 |

(Continued)

*Primary Examiner* — Joseph M Rocca
*Assistant Examiner* — Daniel Yeagley
(74) *Attorney, Agent, or Firm* — Morgan, Lewis & Bockius LLP (57) ABSTRACT

A steer by wire apparatus performing steering operation by turning a wheel when a vehicle turns, may include a tie rod provided with one end pivotally connected to a knuckle of the wheel, a coupling unit rotatably mounted at a sub-frame of a vehicle body, connected to the other end of the tie rod, and converting rotation direction of torque from a first rotation direction to a second rotation direction which is substantially perpendicular to the first rotation direction so as to slidably move the tie rod from the coupling unit and control a steering angle of the wheel, and a motor unit fixed to the sub-frame and supplying the torque to the coupling unit according to a control signal of a vehicle ECU, the rotation direction of the torque being the same as the first rotation direction or being opposite to the first rotation direction.

11 Claims, 5 Drawing Sheets

(56) References Cited

U.S. PATENT DOCUMENTS

| | | |
|---|---|---|
| 8,490,507 B2 * | 7/2013 | Sun .................................. 74/60 |
| 8,545,176 B2 * | 10/2013 | Willis ........................... 415/202 |
| 2007/0120432 A1 * | 5/2007 | Vaden et al. .................... 310/80 |

FOREIGN PATENT DOCUMENTS

| | | |
|---|---|---|
| JP | 5-164137 A | 6/1993 |
| JP | 10-310068 A | 11/1998 |
| JP | 2003-170849 A | 6/2003 |
| JP | 2004-224238 A | 8/2004 |
| JP | 2005-199849 A | 7/2005 |
| JP | 2006-131007 A | 5/2006 |
| JP | 2007-76577 A | 3/2007 |
| JP | 2007-326459 A | 12/2007 |
| KR | 10-005191 A | 1/1999 |
| KR | 10-0723725 B1 | 5/2007 |
| KR | 10-2009-0123212 A | 12/2009 |

* cited by examiner

US 8,789,647 B2

STEER BY WIRE APPARATUS

CROSS-REFERENCE TO RELATED APPLICATION

The present application claims priority to Korean Patent Application No. 10-2009-0119407 filed in the Korean Intellectual Property Office on Dec. 3, 2009, the entire contents of which is incorporated herein for all purposes by this reference.

BACKGROUND OF THE INVENTION

1. Field of the Invention

The present invention relates to a steer by wire apparatus. More particularly, the present invention relates to a steer by wire apparatus which controls a steering angle by converting a vertical rotation caused by a motor into a horizontal rotation.

2. Description of Related Art

Generally, a steering apparatus is an apparatus for controlling a moving direction of a vehicle. A driver rotates a steering wheel so as to change the moving direction to his intention. Such a steering apparatus is an important means for the driver to drive and control the vehicle.

According to the steering apparatus, if the driver rotates the steering wheel, torque generated by the rotation of the steering wheel is applied to a wheel.

Recently, a steer by wire (SBW) apparatus is used for steering a front wheel between the steering wheel and the front wheel.

Such a steer by wire apparatus includes a steering wheel which a driver directly handles for steering, a reaction motor mounted at one side of the steering wheel and supplying reaction torque according to a rotation of the steering wheel, an actuator connected to a tie rod and performing a steering operation, a sensing means detecting a change of torque, a steering angle, and a vehicle speed according to the rotation of the steering wheel, and an ECU operating the actuator and the reaction motor according to an electrical signal transmitted from the sensing means.

Figure 5:
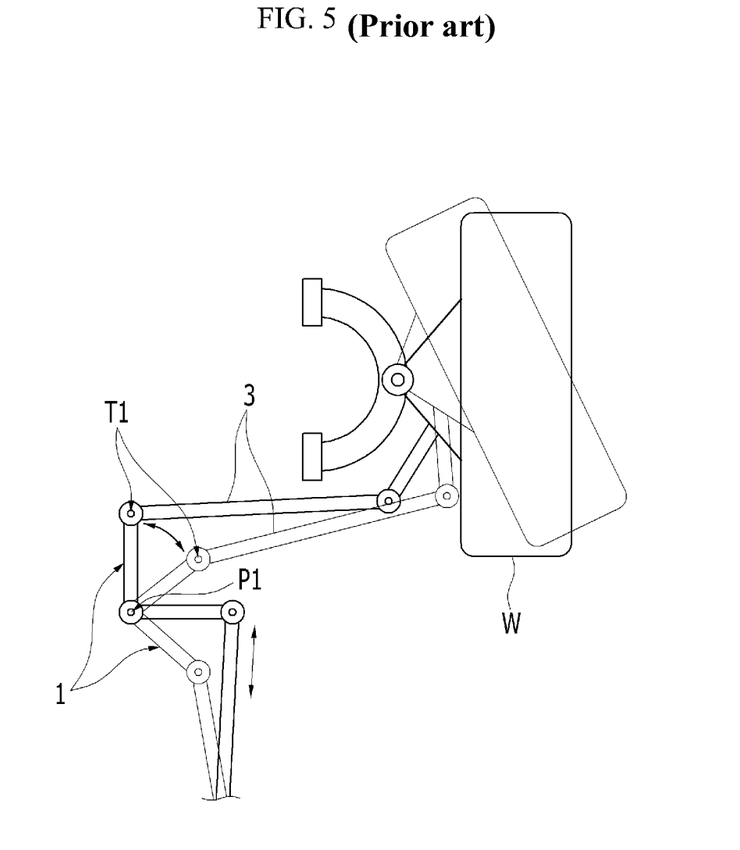
FIG. 5 is a schematic diagram showing movements of a tie rod according to a conventional steer by wire apparatus.

FIG. 5 is a schematic diagram showing movements of a tie rod according to a conventional steer by wire apparatus. As shown in FIG. 5, a tie rod 3 is moved by operating L-shape levers 1 pivoted at a point P1 through an actuator (not shown) according to a conventional steer by wire apparatus.

If the actuator inputs reciprocal motions to the L-shape lever 1, the L-shape lever 1 pivots about the point P1 and makes a tie rod inner point T1 move to the left or to the right. Thereby, a steering angle of the wheel W is controlled.

According to a conventional SBW mechanism different from a conventional rack and pinion mechanism, the tie rod inner point T1 moves forward or rearward as well as to the left or to the right. Therefore, geometry characteristic of the tie rod may change.

In addition, the L-shape levers 1 and the tie rod 3 are operated only by the actuator when steering the wheel. Therefore, performance on demand of the actuator and cost may increase. In addition, since an external force is transmitted to the actuator through the wheel, load and usage of current may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a steer by wire apparatus having advantages of optimizing capacity and size of a motor and preventing geometry characteristic from being changed as a consequence of controlling a steering angle through a coupling unit which converts a vertical rotation caused by a motor into a horizontal rotation.

In an aspect of the present invention, the steer by wire apparatus performing steering operation by turning a wheel to the left or to the right when a vehicle turns, may include a tie rod provided with one end pivotally connected to a knuckle of the wheel, a coupling unit rotatably mounted at a sub-frame of a vehicle body, connected to the other end of the tie rod, and converting rotation direction of torque from a first rotation direction to a second rotation direction which is substantially perpendicular to the first rotation direction so as to slidably move the tie rod from the coupling unit and control a steering angle of the wheel, and a motor unit fixed to the sub-frame and supplying the torque to the coupling unit according to a control signal of a vehicle ECU, the rotation direction of the torque being the same as the first rotation direction or being opposite to the first rotation direction.

The coupling unit may include a first rotation shaft rotatably mounted on the sub-frame through a bearing device, and receiving the torque from the motor unit, a second rotation shaft substantially perpendicularly disposed to the first rotation shaft, rotatably mounted on the sub-frame through a bearing device, wherein the other end of the tie rod is slidably connected to the second rotation shaft, and a plurality of couplers engaging the first rotation shaft with the second rotation shaft.

The first and second rotation shafts may have a cylindrical shape, a plurality of first insert holes is formed at one surface portion of the first rotation shaft with a predetermined depth, and a plurality of second insert holes corresponding to the plurality of first insert holes is formed with a predetermined depth at one surface portion of the second rotation shaft close to the one surface portion of the first rotation shaft The first insert holes may be formed at the one surface portion of the first rotation shaft with a distance therebetween along a circumferential direction thereof, wherein the first insert holes are formed with an equal distance from a rotation center of the first rotation shaft.

The second insert holes may be formed at the one surface portion of the second rotation shaft close to the one surface portion of the first rotation shaft with a distance therebetween along a circumferential direction thereof, wherein the second insert holes are formed with an equal distance from a rotation center of the second rotation shaft.

Each coupler may have one end slidably and rotatably inserted in each first insert hole and the other end thereof slidably and rotatably inserted in each corresponding second insert hole.

Each coupler may have a "⌐" shape (right-angle inverted L shape), the one end of each coupler is inserted in each first insert hole with a different depth, and the other end of each coupler is inserted in each corresponding second insert hole with a different depth.

The one end of each coupler may be slid in each first insert hole when each first insert hole is rotated by the first rotation shaft, and each second insert hole is moved by a slide of the other end of each coupler in each second insert hole such that the torque of the first rotation shaft is transmitted to the second rotation shaft by the coupler.

The other end of the second rotation shaft may be connected to the tie rod through a ball screw to move the tie rod slidably.

The motor unit may include a drive motor fixedly mounted at the sub-frame and provided with a rotation shaft, a driving pulley fixedly mounted at the rotation shaft of the drive motor, a driven pulley fixedly mounted at the other end of the first rotation shaft, and a driving belt connecting the driving pulley with the driven pulley, wherein the drive motor is a motor which can control a rotation speed and a rotating direction thereof according to the control signal of the vehicle ECU.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
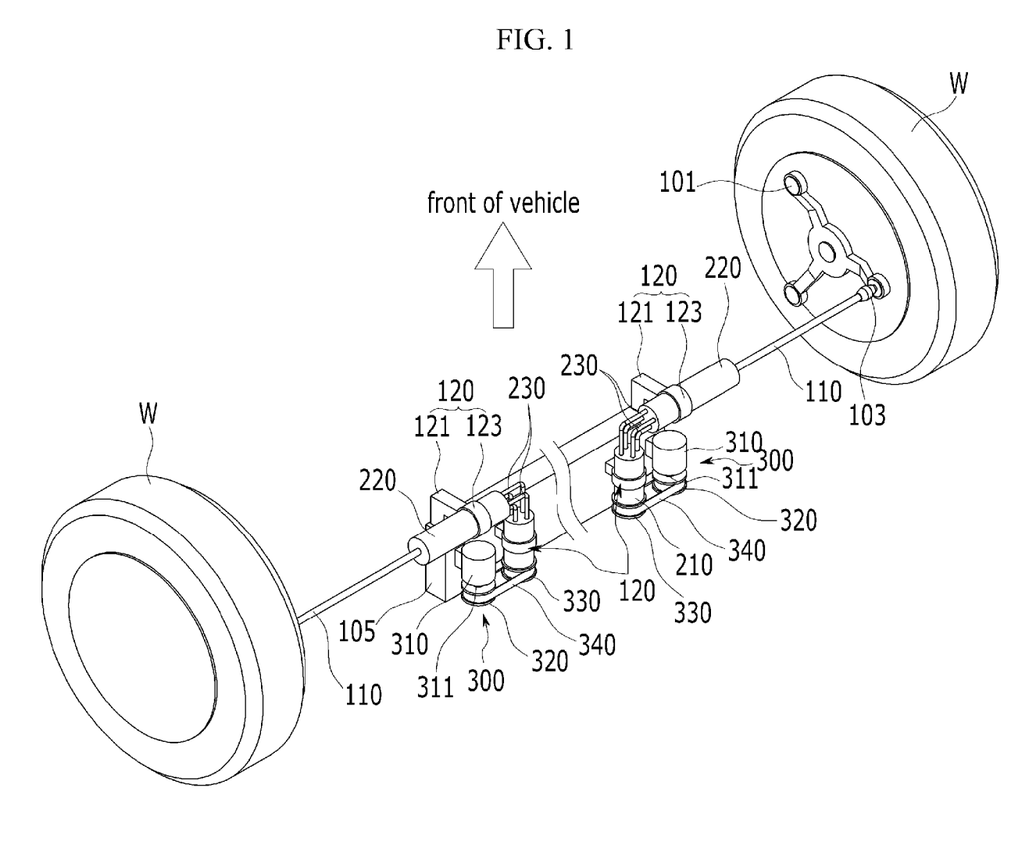
FIG. 1 is a perspective view of a steer by wire apparatus according to an exemplary embodiment of the present invention.
Figure 2:
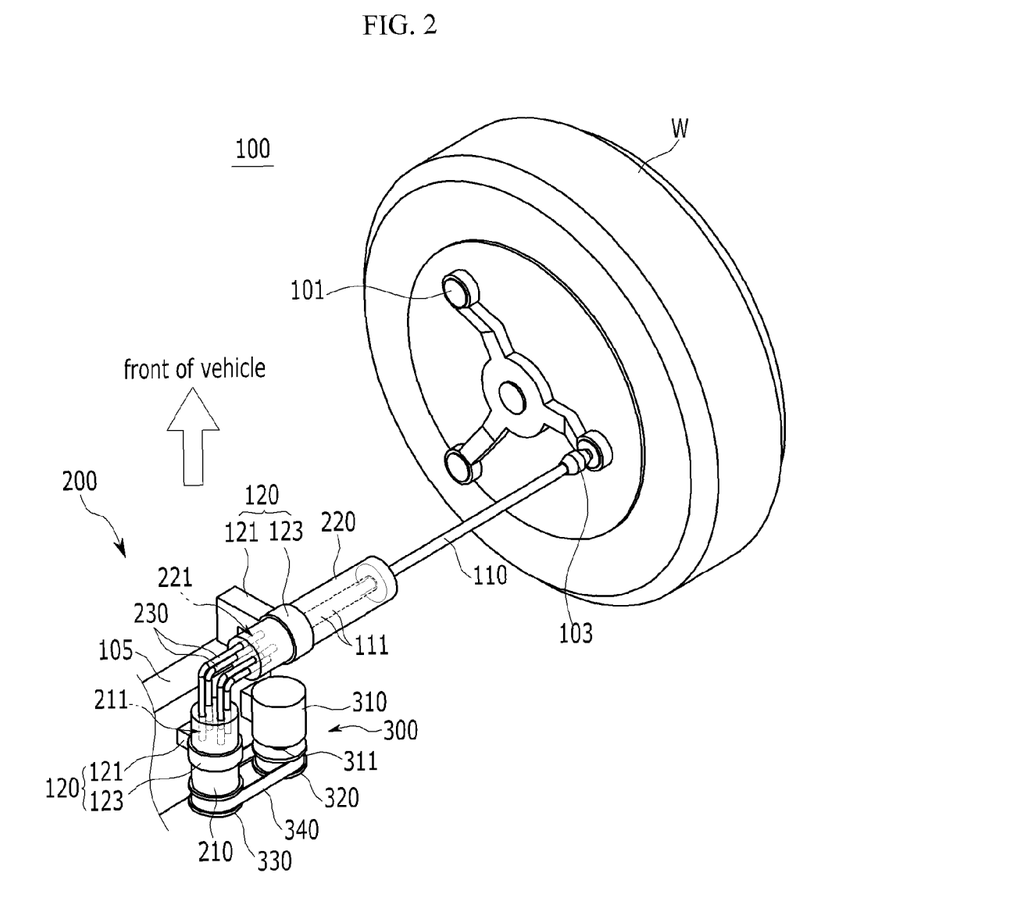
FIG. 2 is a partial enlarged view of FIG. 1.
Figure 3:
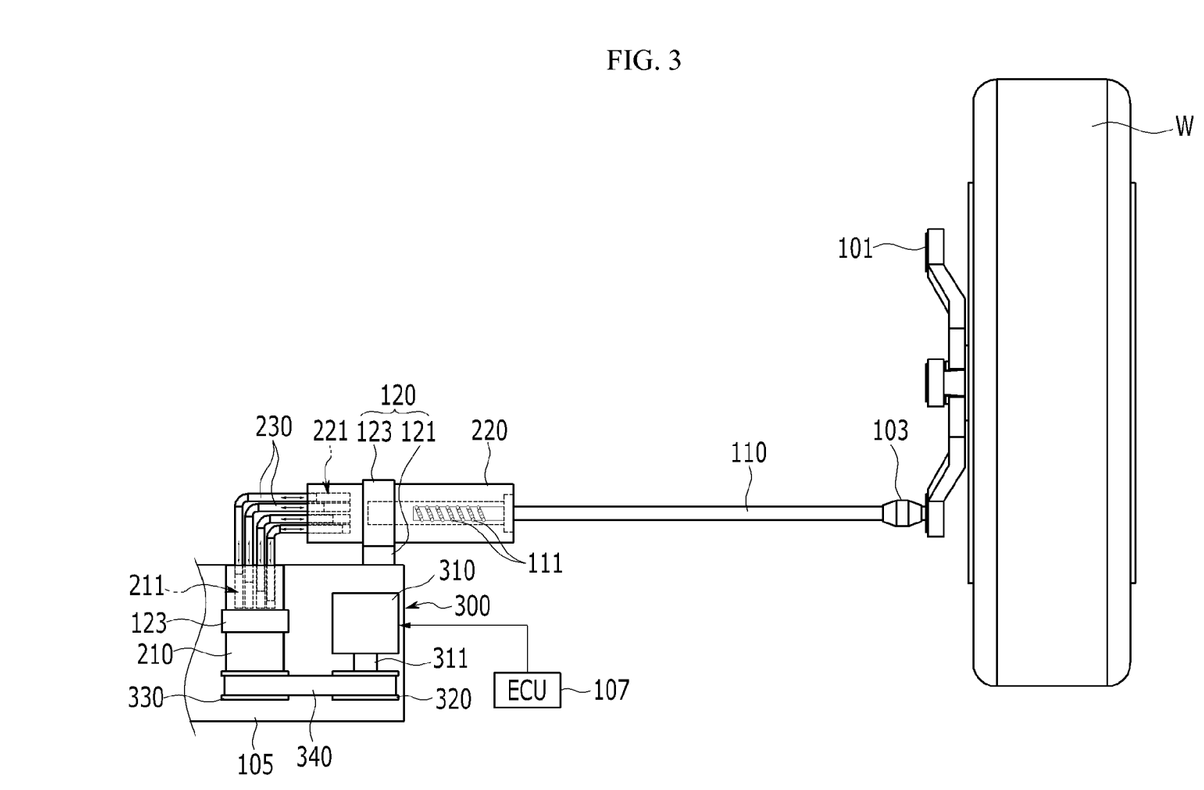
FIG. 3 is a top plan view of a steer by wire apparatus according to an exemplary embodiment of the present invention.

FIG. 1 is a perspective view of a steer by wire apparatus according to an exemplary embodiment of the present invention, FIG. 2 is a partial enlarged view of FIG. 1, and FIG. 3 is a top plan view of a steer by wire apparatus according to an exemplary embodiment of the present invention.

Referring to the drawings, a steer by wire apparatus 100 according to an exemplary embodiment of the present invention controls a steering angle through a coupling unit 200 which converts a vertical rotation caused by a motor into a horizontal rotation. Thereby, capacity and size of the motor may be optimized and geometry characteristic may not be changed.

For this purposes, the steer by wire apparatus 100 according to an exemplary embodiment of the present invention performs steering operation by turning a wheel to the left or to the right when a vehicle turns. As shown in FIG. 1, the steer by wire apparatus 100 includes a tie rod 110, a coupling unit 200, and a motor unit 300.

The tie rod 110 is provided with one end connected to a knuckle 101 of the wheel W through a ball joint 103.

According to the present exemplary embodiment, the coupling unit 200 is rotatably mounted at a sub-frame 105 of a vehicle body and is connected to the other end of the tie rod 110. The coupling unit 200 changes a direction of torque from the vertical direction to the horizontal direction, and moves the tie rod 110 so as to control the steering angle of the wheel W.

Herein, the coupling unit 200, as shown in FIG. 2 and FIG. 3, includes a first rotation shaft 210, a second rotation shaft 220, and a coupler 230, and each component will be described in detail.

According to the present exemplary embodiment, the first rotation shaft 210 is rotatably mounted on the sub-frame 105 through bearing device 120, and receives the torque from the motor unit 300.

The second rotation shaft 220 is disposed vertically to the first rotation shaft 210, is mounted at the sub-frame 105 through bearing device 120, and is connected to the other end of the tie rod 110.

The second rotation shaft 220 is connected to the tie rod 110 through a ball screw 111.

Herein, the first rotation shaft 210 has a cylindrical shape and is provided with a plurality of first insert holes 211 formed at one surface portion thereof. The second rotation shaft 220 is provided with a plurality of second insert holes 221 corresponding to the first insert holes 211 formed at one surface portion thereof close to the one surface portion of the first rotation shaft 210.

The first insert holes 211 are formed at the one surface portion of the first rotation shaft 210 with distances therebetween along a circumferential direction thereof. The second insert holes 221 corresponding to the first insert holes 211 are formed at the one surface portion of the second rotation shaft 220 with distances therebetween along a circumferential direction thereof.

In this specification, it is exemplarily shown that four first and second insert holes 211 and 221 are formed respectively at the first rotation shaft 210 and the second rotation shaft 220 with a central angle of 90°.

Meanwhile, the bearing device 120 includes a mounting block 121 mounted on the sub-frame 105 and a bearing 123.

In addition a plurality of couplers 230 is provided and each coupler 230 connects the first rotation shaft 210 with the second rotation shaft 220.

Herein, one end of each coupler 230 is slidably and rotatably inserted in each first insert hole 211, and the other end of each coupler 230 is slidably and rotatably inserted in each second insert hole 221.

Each coupler 230 has a "⌐" shape, and the one end of each coupler 230 is inserted in each first insert hole 211 with a different depth. In addition, the other end of each coupler 230 is inserted in each second insert hole 221 with a different depth.

According to the present exemplary embodiment, the one end of each coupler 230 is slid in each first insert hole 211 when each first insert hole 211 is moved by a rotation of the first rotation shaft 210.

Accordingly, the other end of each coupler 230 is slid in each second insert hole 221 and each second insert hole 221 is rotated by a slide of each coupler 230. Therefore, the torque of the first rotation shaft 210 is transmitted to the second rotation shaft 220 through each coupler 230.

In addition, the motor unit 300 is mounted at the sub-frame and supplies the torque to the coupling unit 200 according to a control signal of a vehicle ECU 107. The rotation direction of the torque is positive or negative in the vertical rotation direction.

The motor unit 300 includes a drive motor 310, a driving pulley 320, a driven pulley 330, and a driving belt 340.

The drive motor 310 is fixedly mounted at the sub-frame 105.

The drive motor 310 may be a motor which can control a rotation speed and a rotating direction thereof according to the control signal of the vehicle ECU 107.

According to the present exemplary embodiment, the driving pulley 320 is mounted at a rotation shaft 311 of the drive motor 310, and the driven pulley 330 is mounted at the other end of the first rotation shaft 210.

In addition, the driving belt 340 connects the driving pulley 320 with the driven pulley 330.

That is, the motor unit 300 operates the drive motor 310 according to the control signal of the vehicle ECU 107 and rotates the driving pulley 320. Then, the torque of the driving pulley 320 is transmitted to the driven pulley 330 through the driving belt 340, and the first rotation shaft 210 is rotated.

An operation of a steer by wire apparatus according to an exemplary embodiment of the present invention will hereinafter be described in detail.

Figure 4:
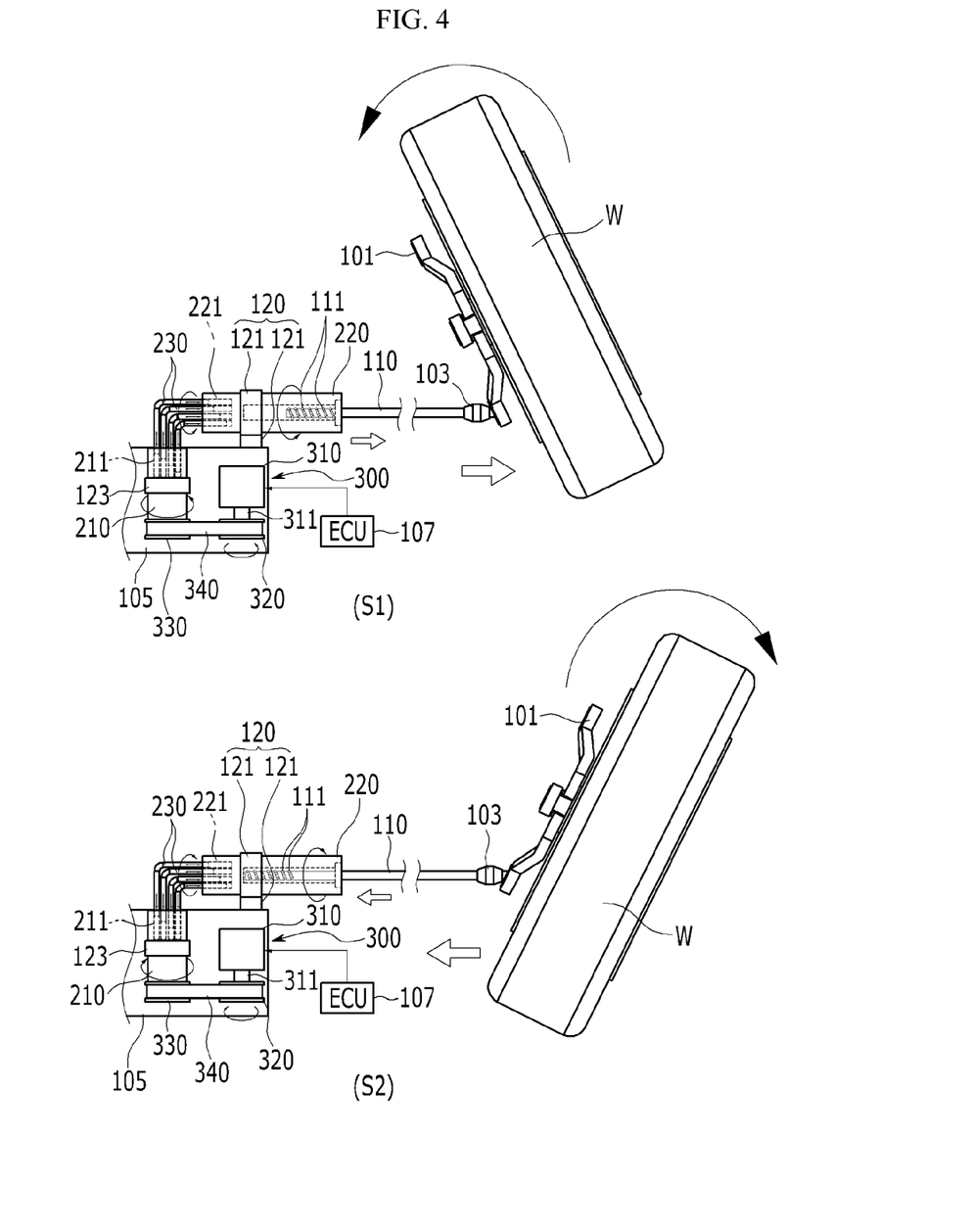
FIG. 4 is a schematic diagram showing an operation of a steer by wire apparatus according to an exemplary embodiment of the present invention.

FIG. 4 is a schematic diagram showing an operation of a steer by wire apparatus according to an exemplary embodiment of the present invention.

When a vehicle turns to the left as shown in S1 of FIG. 4, the drive motor 310 rotates counterclockwise according to the control signal of the vehicle ECU 107.

The driving pulley 320 transmits the torque of the drive motor 310 to the driven pulley 330 through the driving belt 340, and the first rotation shaft 210 rotates counterclockwise.

If the first rotation shaft 210 rotates counterclockwise, the first insert holes 211 rotates counterclockwise and the one end of each coupler 230 also rotates counterclockwise by the first insert holes 211. Therefore, the one end of each coupler 230 slides in each first insert hole 211.

Simultaneously, the other end of each coupler 230 rotates the second insert holes 221 counterclockwise and slides in each second insert hole 221.

As a result, the second rotation shaft 220 rotates counterclockwise by the first rotation shaft 210 and the couplers 230.

At this time, the tie rod 110 moves from the second rotation shaft 220 to the wheel W by the ball screw 111, and the wheel W turns to the left.

On the contrary, when the vehicle turns to the right as shown in S2 of FIG. 4, the drive motor 310 rotates clockwise according to the control signal of the vehicle ECU 107.

The driving pulley 320 transmits the torque of the drive motor 310 to the driven pulley 330 through the driving belt 340, and the first rotation shaft 210 rotates clockwise.

If the first rotation shaft 210 rotates clockwise, the first insert holes 211 rotates clockwise and the one end of each coupler 230 also rotates clockwise by the first insert holes 211. Therefore, the one end of each coupler 230 slides in each first insert hole 211.

Simultaneously, the other end of each coupler 230 rotates the second insert holes 221 clockwise and slides in each second insert hole 221.

As a result, the second rotation shaft 220 rotates clockwise by the first rotation shaft 210 and the couplers 230. At this time, the tie rod 110 moves from the wheel W to the second rotation shaft 220 by the ball screw 111, and the wheel W turns to the right.

That is, the coupling unit 200 transmits the torque of the first rotation shaft 210 to the second rotation shaft 220 through the rotation and the slide of both ends of the coupler 230.

The tie rod 110 receives the torque of the motor unit 300 and changes the steering angle of the wheel W by moving toward or away from the second rotation shaft 220.

Therefore, according to an exemplary embodiment of the present invention, capacity and size of a motor may be optimized and changes in geometry characteristic may be prevented by controlling the steering angle through the coupling unit 200 which can convert the vertical rotation caused by the motor into the horizontal rotation.

In addition, the steer by wire apparatus according to an exemplary embodiment of the present invention may have simple structures, may reduce cost by controlling the steering angle through the torque, and may prevent excessive load from being applied to the motor by cancelling the external load through the driving belt.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steer by wire apparatus performing steering operation by turning a wheel to the left or to the right when a vehicle turns, comprising:
   a tie rod provided with one end pivotally connected to a knuckle of the wheel;
   a coupling unit rotatably mounted at a sub-frame of a vehicle body, connected to the other end of the tie rod, and converting rotation direction of torque from a first rotation direction to a second rotation direction which is substantially perpendicular to the first rotation direction so as to slidably move the tie rod from the coupling unit and control a steering angle of the wheel;

a motor unit fixed to the sub-frame and supplying the torque to the coupling unit according to a control signal of a vehicle ECU, the rotation direction of the torque being the same as the first rotation direction or being opposite to the first rotation direction;

wherein the coupling unit includes:
 a first rotation shaft rotatably mounted on the sub-frame through a bearing device, and receiving the torque from the motor unit;
 a second rotation shaft substantially perpendicularly disposed to the first rotation shaft, rotatably mounted on the sub-frame through a bearing device, wherein the other end of the tie rod is slidably connected to the second rotation shaft; and
 a plurality of couplers engaging the first rotation shaft with the second rotation shaft; and wherein the first and second rotation shafts have a cylindrical shape, a plurality of first insert holes is formed at one surface portion of the first rotation shaft with a predetermined depth, and a plurality of second insert holes corresponding to the plurality of first insert holes is formed with a predetermined depth at one surface portion of the second rotation shaft close to the one surface portion of the first rotation shaft.

2. The steer by wire apparatus of claim 1, wherein the first insert holes are formed at the one surface portion of the first rotation shaft with a distance therebetween along a circumferential direction thereof.

3. The steer by wire apparatus of claim 2, wherein the first insert holes are formed with an equal distance from a rotation center of the first rotation shaft.

4. The steer by wire apparatus of claim 1, wherein the second insert holes are formed at the one surface portion of the second rotation shaft close to the one surface portion of the first rotation shaft with a distance therebetween along a circumferential direction thereof.

5. The steer by wire apparatus of claim 4, wherein the second insert holes are formed with an equal distance from a rotation center of the second rotation shaft.

6. The steer by wire apparatus of claim 1, wherein each coupler has one end slidably and rotatably inserted in each first insert hole and the other end thereof slidably and rotatably inserted in each corresponding second insert hole.

7. The steer by wire apparatus of claim 1, wherein each coupler has a right-angle shape, the one end of each coupler is inserted in each first insert hole with a different depth, and the other end of each coupler is inserted in each corresponding second insert hole with a different depth.

8. The steer by wire of claim 1, wherein the one end of each coupler is slid in each first insert hole when each first insert hole is rotated by the first rotation shaft, and each second insert hole is moved by a slide of the other end of each coupler in each second insert hole such that the torque of the first rotation shaft is transmitted to the second rotation shaft by the coupler.

9. The steer by wire of claim 1, wherein the other end of the second rotation shaft is connected to the tie rod through a ball screw to move the tie rod slidably.

10. The steer by wire of claim 1, wherein the motor unit comprises:
 a drive motor fixedly mounted at the sub-frame and provided with a rotation shaft;
 a driving pulley fixedly mounted at the rotation shaft of the drive motor;
 a driven pulley fixedly mounted at the other end of the first rotation shaft; and
 a driving belt connecting the driving pulley with the driven pulley.

11. The steer by wire apparatus of claim 10, wherein the drive motor is a motor which can control a rotation speed and a rotating direction thereof according to the control signal of the vehicle ECU.

* * * * *